United States Patent
He

(10) Patent No.: US 12,536,914 B2
(45) Date of Patent: Jan. 27, 2026

(54) METHOD AND SYSTEM FOR TAXI ASSIST PATH GENERATION BASED ON GUIDANCE LINES OF AN AIRPORT

(71) Applicant: HONEYWELL INTERNATIONAL INC., Charlotte, NC (US)

(72) Inventor: Zuowei He, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 187 days.

(21) Appl. No.: 18/454,143

(22) Filed: Aug. 23, 2023

(65) Prior Publication Data

US 2025/0069512 A1  Feb. 27, 2025

(51) Int. Cl.
*G08G 5/51* (2025.01)

(52) U.S. Cl.
CPC ........................ *G08G 5/51* (2025.01)

(58) Field of Classification Search
CPC ... G08G 5/51; G08G 5/21; G08G 5/20; B64D 43/00
See application file for complete search history.

(56) References Cited

U.S. PATENT DOCUMENTS

| | | | |
|---|---|---|---|
| 10,699,588 B2 | 6/2020 | Marik et al. | |
| 12,190,743 B2* | 1/2025 | Kalyan | G08G 5/727 |
| 2009/0192701 A1* | 7/2009 | Levy | G08G 5/51 |
| | | | 701/117 |
| 2010/0140392 A1* | 6/2010 | Perry | B64F 1/22 |
| | | | 244/50 |
| 2010/0198489 A1* | 8/2010 | Rozovski | G08G 5/51 |
| | | | 701/120 |
| 2011/0224845 A1* | 9/2011 | Perry | B64F 1/10 |
| | | | 701/99 |
| 2011/0282565 A1* | 11/2011 | Law | G08G 5/51 |
| | | | 701/117 |
| 2013/0103297 A1* | 4/2013 | Bilek | G08G 5/21 |
| | | | 701/120 |
| 2014/0249748 A1* | 9/2014 | Strassenburg-Kleciak | G01C 21/3658 |
| | | | 701/437 |
| 2014/0303815 A1* | 10/2014 | Lafon | G08G 5/51 |
| | | | 701/3 |
| 2015/0330797 A1* | 11/2015 | Shukla | B64D 11/0015 |
| | | | 701/533 |
| 2016/0125741 A1* | 5/2016 | Shorter, Jr. | G06Q 10/10 |
| | | | 701/528 |

(Continued)

FOREIGN PATENT DOCUMENTS

| | | |
|---|---|---|
| CN | 114545980 A | 5/2022 |
| EP | 3200171 A1 | 8/2017 |

*Primary Examiner* — Ashley L Redhead, Jr.
(74) *Attorney, Agent, or Firm* — Ingrassia Fisher & Lorenz LLP

(57) ABSTRACT

A method and system for generating a taxi assist path for an aircraft at an airport has been developed. First, a network of taxiways/runways for the airport is retrieved and used to generate multiple taxi assist paths for the aircraft from the present location of the aircraft to the destination of the aircraft. An optimum taxi assist path is selected for the aircraft from the multiple taxi assist paths. A mapping diagram of painted taxiway guidance lines for the airport is retrieved. The optimum taxi assist path is then modified to match corresponding painted taxiway guidance lines and displayed on an aircraft display device.

16 Claims, 6 Drawing Sheets

(56) References Cited

U.S. PATENT DOCUMENTS

| | | | |
|---|---|---|---|
| 2016/0140855 A1* | 5/2016 | Gannon | G08G 5/21 |
| | | | 701/533 |
| 2016/0171899 A1* | 6/2016 | Depare | G08G 5/21 |
| | | | 701/428 |
| 2017/0148333 A1* | 5/2017 | Alonso Tabares | G05D 1/0083 |
| 2019/0072976 A1* | 3/2019 | Bell | C09D 5/22 |
| 2019/0172361 A1* | 6/2019 | Schwindt | G08G 5/21 |
| 2020/0357293 A1* | 11/2020 | Jiang | G08G 5/51 |
| 2021/0103860 A1* | 4/2021 | de Oliveira | G06Q 10/04 |
| 2021/0350715 A1* | 11/2021 | Liu | G08G 5/21 |
| 2022/0005364 A1 | 1/2022 | Wang et al. | |
| 2022/0307853 A1* | 9/2022 | Davis | G01C 21/3492 |
| 2022/0343780 A1* | 10/2022 | Miller | G06F 3/04886 |
| 2023/0060551 A1 | 3/2023 | Khatwa | |
| 2023/0066629 A1* | 3/2023 | Belamkonda | G08G 5/51 |
| 2023/0076554 A1* | 3/2023 | Shyman | G08G 5/22 |
| 2024/0105069 A1* | 3/2024 | Costas Alvarez | G08G 5/727 |
| 2024/0144836 A1* | 5/2024 | Chik | G08G 5/51 |
| 2024/0300666 A1* | 9/2024 | Gariel | G06T 7/215 |
| 2025/0029504 A1* | 1/2025 | Sankeshwari | G08G 5/80 |

\* cited by examiner

METHOD AND SYSTEM FOR TAXI ASSIST PATH GENERATION BASED ON GUIDANCE LINES OF AN AIRPORT

TECHNICAL FIELD

The present invention generally relates to aircraft operations, and more particularly relates to a method and system for taxi assist path generation based on guidance lines of an airport.

BACKGROUND

Current taxi assist computation algorithms for an airport network will typically generate a taxi assist path in response to pilot input. The taxi assist path typically contains number of lines from start position (typically aircraft position) to the destination (runway, parking stand or other airport elements). However, the taxi assist path is divided up into multiple straight line segments to may not correspond to actual guidance lines that are in place on the airport runway. Hence, there is a need for a method and system for taxi assist path generation based on guidance lines of an airport.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for generating a taxi assist path for an aircraft at an airport. The method comprises: retrieving a network of taxiways/runways for the airport; generating multiple taxi assist paths for the aircraft from a present location of the aircraft to a destination of the aircraft; selecting an optimum taxi assist path for the aircraft; retrieving a mapping diagram of painted taxiway guidance lines for the airport; modifying the optimum taxi assist path to match corresponding painted taxiway guidance lines; and displaying the modified optimum taxiway on an aircraft display device.

A system is provided for generating a taxi assist path for an aircraft at an airport. The system comprises: a computing device located onboard the aircraft, where the computing device, retrieves a network of taxiways/runways for the airport from a data source, generates multiple taxi assist paths for the aircraft from a present location of the aircraft to a destination of the aircraft, selects an optimum taxi assist path for the aircraft, retrieves a mapping diagram of painted taxiway guidance lines for the airport, and modifies the optimum taxi assist path to match corresponding painted taxiway guidance lines; and an aircraft display device that displays the modified optimum taxiway.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for generating a taxi assist path for an aircraft at an airport has been developed. First, a network of taxiways/runways for the airport is received and used to multiple taxi assist paths for the aircraft from the present location of the aircraft to the destination of the aircraft. An optimum taxi assist path is selected for the aircraft from the multiple taxi assist paths. A mapping diagram of painted taxiway guidance lines for the airport is retrieved. The optimum taxi assist path is then modified to match corresponding painted taxiway guidance lines and displayed on an aircraft display device.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight, and is usually filed with an aviation authority (e.g., Federal Aviation Administration). An intended flight may also be referred to as a "trip", and extends from a departure airport at the beginning point of the trip to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Figure 1:
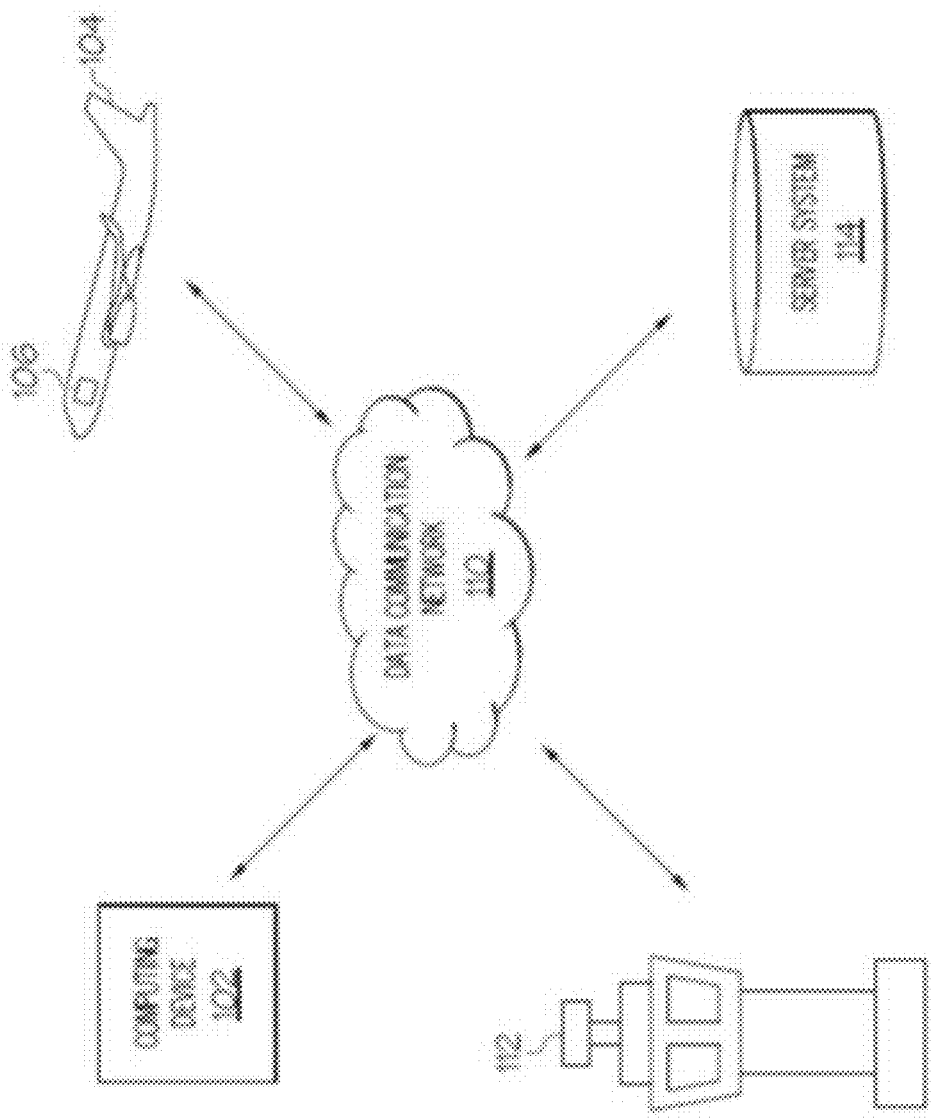
FIG. 1 is a diagram of a system for providing taxi assist path generation in accordance with the disclosed embodiments.

Turning now to the figures, FIG. 1 is a diagram of a system 100 for providing taxi assist path generation in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may be separate from, or integrated within, a preexisting mobile platform management system, avionics system, or aircraft flight management system (FMS).

Figure 2:
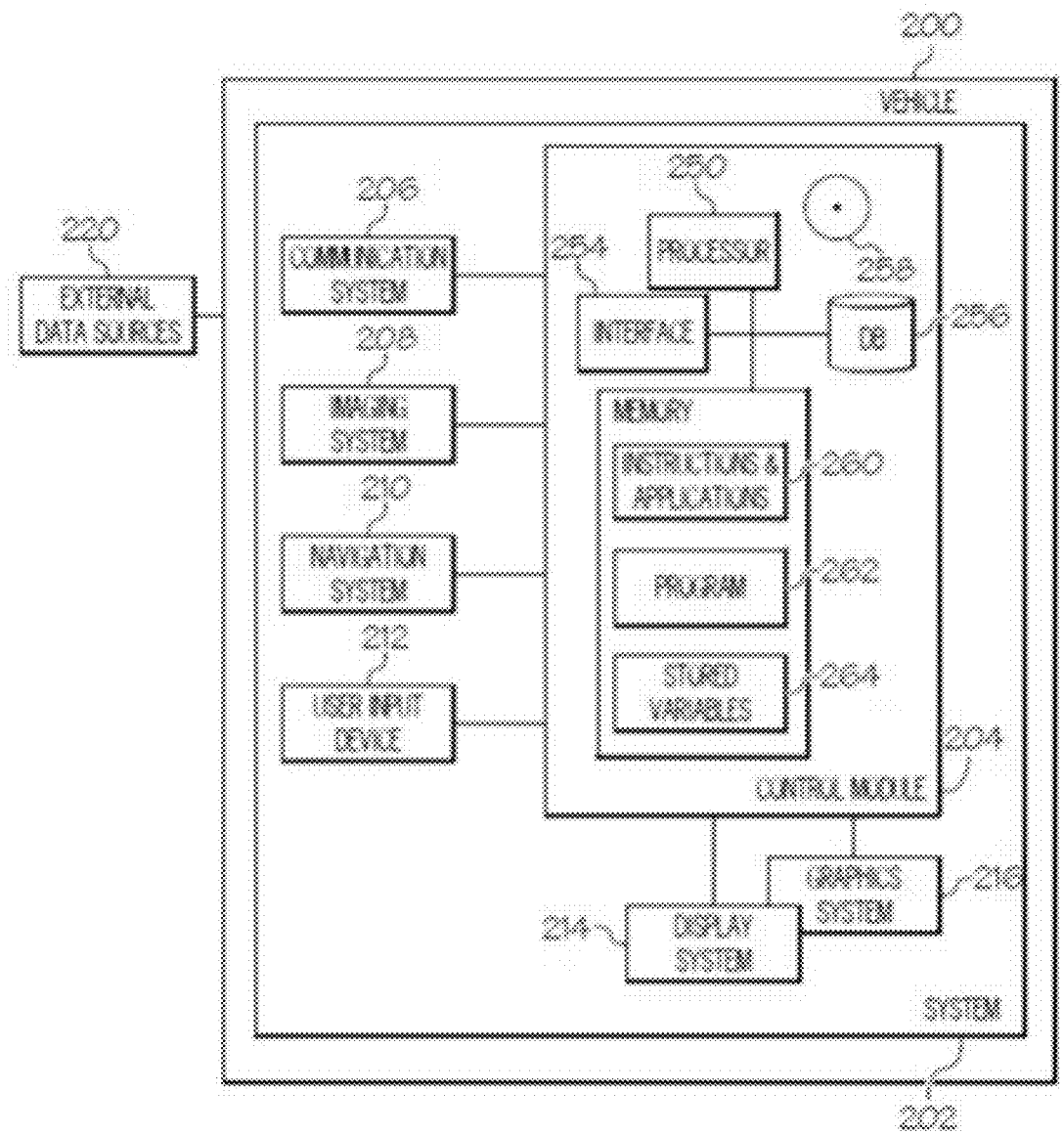
FIG. 2 is a diagram of a vehicle system includes a control module that is operationally coupled to a communication system and an imaging system in accordance with the disclosed embodiments.

Turning now to FIG. 2, in the depicted embodiment, the vehicle system 202 includes: the control module 204 that is operationally coupled to a communication system 206, an imaging system 208, a navigation system 210, a user input device 212, a display system 214, and a graphics system 216. The operation of these functional blocks is described in more detail below. In the described embodiments, the depicted vehicle system 202 is generally realized as an aircraft flight deck display system within a vehicle 200 that is an aircraft; however, the concepts presented here can be deployed in a variety of mobile platforms, such as land vehicles, spacecraft, watercraft, and the like. Accordingly, in various embodiments, the vehicle system 202 may be associated with or form part of larger aircraft management system, such as a flight management system (FMS).

In the illustrated embodiment, the control module 204 is coupled to the communications system 206, which is configured to support communications between external data source(s) 220 and the aircraft. External source(s) 220 may comprise air traffic control (ATC), or other suitable command centers and ground locations. Data received from the external source(s) 220 includes the instantaneous, or current, visibility report associated with a target landing location or identified runway. In this regard, the communications system 206 may be realized using a radio communication system or another suitable data link system.

The imaging system 208 is configured to use sensing devices to generate video or still images and provide image data therefrom. The imaging system 208 may comprise one or more sensing devices, such as cameras, each with an associated sensing method. Accordingly, the video or still images generated by the imaging system 208 may be referred to herein as generated images, sensor images, or sensed images, and the image data may be referred to as sensed data. In an embodiment, the imaging system 208 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 208 comprises a radar based video camera system. Radar based systems emit pulses of electromagnetic radiation and listen for, or sense, associated return echoes. The radar system may generate an image or video based upon the sensed echoes. In another embodiment, the imaging system 208 may comprise a sonar system. The imaging system 208 uses methods other than visible light to generate images, and the sensing devices within the imaging system 208 are much more sensitive than a human eye. Consequently, the generated images may comprise objects, such as mountains, buildings, or ground objects, that a pilot might not otherwise see due to low visibility conditions.

In various embodiments, the imaging system 208 may be mounted in or near the nose of the aircraft (vehicle 200) and calibrated to align an imaging region with a viewing region of a primary flight display (PFD) or a Head Up display (HUD) rendered on the display system 214. For example, the imaging system 208 may be configured so that a geometric center of its field of view (FOV) is aligned with or otherwise corresponds to the geometric center of the viewing region on the display system 214. In this regard, the imaging system 208 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 214 are three dimensional, and the imaging system 208 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 210, or other aircraft and/or flight management systems.

Navigation system 210 is configured to provide real-time navigational data and/or information regarding operation of the aircraft. The navigation system 210 may be realized as a global positioning system (GPS), inertial reference system (IRS), or a radio-based navigation system (e.g., VHF omnidirectional radio range (VOR) or long range aid to navigation (LORAN)), and may include one or more navigational radios or other sensors suitably configured to support operation of the navigation system 210, as will be appreciated in the art. The navigation system 210 is capable of obtaining and/or determining the current or instantaneous position and location information of the aircraft (e.g., the current latitude and longitude) and the current altitude or above ground level for the aircraft. Additionally, in an exemplary embodiment, the navigation system 210 includes inertial reference sensors capable of obtaining or otherwise determining the attitude or orientation (e.g., the pitch, roll, and yaw, heading) of the aircraft relative to earth.

The user input device 212 is coupled to the control module 204, and the user input device 212 and the control module 204 are cooperatively configured to allow a user (e.g., a pilot, co-pilot, or crew member) to interact with the display system 214 and/or other elements of the vehicle system 202 in a conventional manner. The user input device 212 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 212 may be integrated with a display device. Non-limiting examples of uses for the user input device 212 include: entering values for stored variables 264, loading or updating instructions and applications 260, and loading and updating the contents of the database 256, each described in more detail below.

The generated images from the imaging system 208 are provided to the control module 204 in the form of image data. The control module 204 is configured to receive the image data and convert and render the image data into display commands that command and control the renderings of the display system 214. This conversion and rendering may be performed, at least in part, by the graphics system 216. In some embodiments, the graphics system 216 may be integrated within the control module 204; in other embodiments, the graphics system 216 may be integrated within the display system 214. Regardless of the state of integration of these subsystems, responsive to receiving display commands from the control module 204, the display system 214 displays, renders, or otherwise conveys one or more graphical representations or displayed images based on the image data (i.e., sensor based images) and associated with operation of the vehicle 200, as described in greater detail below. In various embodiments, images displayed on the display system 214 may also be responsive to processed user input that was received via a user input device 212.

In general, the display system 214 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 214 may be part of, or include, a primary flight display (PFD) system, a panel-mounted head down display (HDD), a head up display (HUD), or a head mounted display system, such as a "near to eye display" system. The display system 214 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 204 performs the functions of the vehicle system 202. With continued reference to FIG. 2, within the control module 204, the processor 250 and the memory 252 (having therein the program 262) form a novel processing engine that performs the described processing activities in accordance with the program 262, as is described in more detail below. The control module 204 generates display signals that command and control the display system 214.

The control module 204 includes an interface 254, communicatively coupled to the processor 250 and memory 252 (via a bus 255), database 256, and an optional storage disk 258. In various embodiments, the control module 204 performs actions and other functions in accordance with other embodiments. The processor 250 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 252, the database 256, or a disk 258 maintain data bits and may be utilized by the processor 250 as both storage and a scratch pad. The memory locations where data bits are maintained are physical locations that have particular electrical, magnetic, optical, or organic properties corresponding to the data bits. The memory 252 can be any type of suitable computer readable storage medium. For example, the memory 252 may include various types of dynamic random access memory (DRAM) such as SDRAM, the various types of static RAM (SRAM), and the various types of non-volatile memory (PROM, EPROM, and flash). In certain examples, the memory 252 is located on and/or co-located on the same computer chip as the processor 250. In the depicted embodiment, the memory 252 stores the above-referenced instructions and applications 260 along with one or more configurable variables in stored variables 264. The database 256 and the disk 258 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 256 may be organized and/or imported from an external source 220 during an initialization step of a process.

The bus 255 serves to transmit programs, data, status and other information or signals between the various components of the control module 204. The bus 255 can be any suitable physical or logical means of connecting computer systems and components. This includes, but is not limited to, direct hard-wired connections, fiber optics, infrared and wireless bus technologies.

The interface 254 enables communications within the control module 204, can include one or more network interfaces to communicate with other systems or components, and can be implemented using any suitable method and apparatus. For example, the interface 254 enables communication from a system driver and/or another computer system. In one embodiment, the interface 254 obtains data from external data source(s) 220 directly. The interface 254 may also include one or more network interfaces to communicate with technicians, and/or one or more storage interfaces to connect to storage apparatuses, such as the database 256.

It will be appreciated that the vehicle system 202 may differ from the embodiment depicted in FIG. 2. As mentioned, the vehicle system 202 can be integrated with an existing flight management system (FMS) or aircraft flight deck display.

During operation, the processor 250 loads and executes one or more programs, algorithms and rules embodied as instructions and applications 260 contained within the memory 252 and, as such, controls the general operation of the control module 204 as well as the vehicle system 202. In executing the process described herein, the processor 250 specifically loads and executes the novel program 262. Additionally, the processor 250 is configured to process received inputs (any combination of input from the communication system 206, the imaging system 208, the navigation system 210, and user input provided via user input device 212), reference the database 256 in accordance with the program 262, and generate display commands that command and control the display system 214 based thereon.

Figure 3:
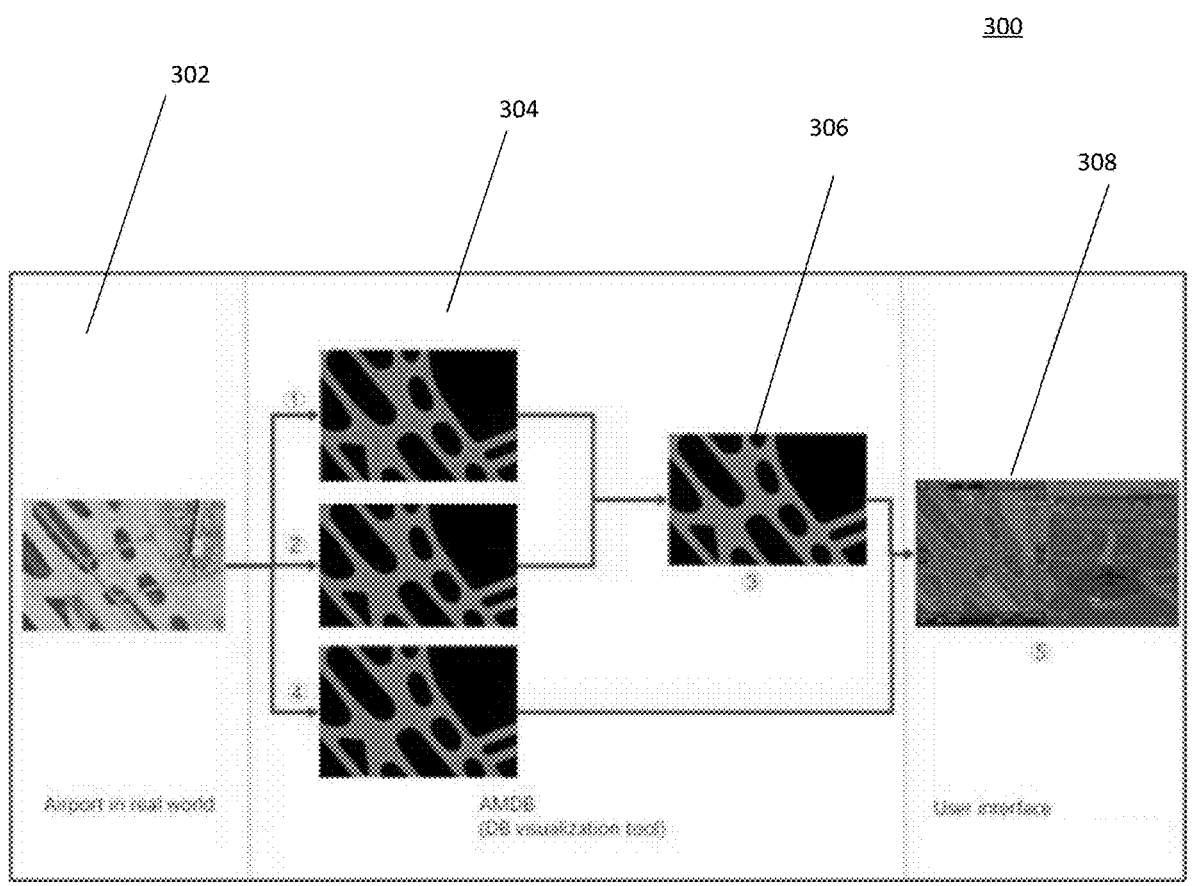
FIG. 3 are diagrams of images of an airport taxiway network in accordance with the disclosed embodiments.

Turning now to FIG. 3, diagrams 300 of comparison images are shown of an airport taxiway network in accordance with the disclosed embodiments. The first image 302 is a real world image of the airport. An airport mapping database (AMDB) is accessed to retrieve mapping image 304 of the airport that is used to generate multiple possible taxiways 304 from which an optimum taxiway 306 is selected. The optimum taxiway is the depicted as an image on a user interface (UI) 308 in either two dimension (2D), three dimensions (3D) or both in a side-by-side display as show.

A taxi assist algorithm utilizes airport network images and mapping data to compute and populate the taxi assist path for pilot use. The airport network images are specifically designed for the taxi assist algorithm to utilize path computations and path construction. The airport network includes two basic elements: nodes and edges. The nodes are intersecting points of taxiways and runways. The edges are lines between nodes. Each edge represents one segment of taxiway or runway. The taxi assist path contains number of edges from start position (e.g., a parked aircraft position) to the destination (e.g., runway, parking stand or other airport destinations).

The taxi assist algorithm includes two phases: path computation and path construction. The path computation phase uses an algorithm to generate an edge based taxi assist path which comprises a series of line segments series connected from a start point to a destination. The path construction phase uses a supplement algorithm to enhance path smoothness and accuracy. The construction phase typically uses smaller line segments linked in series between the taxi assist path edges.

The path computation phase of the taxi assist path output is of a taxi assist path based on edges, which means the taxi assist path display is mostly straight line connections even for the turns along the taxiway. To improve the taxi assist path display, the path construction algorithm is specifically designed to construct taxi assist path using smoothed arc connections instead of straight line or "dog-leg" line connections.

Figure 4:
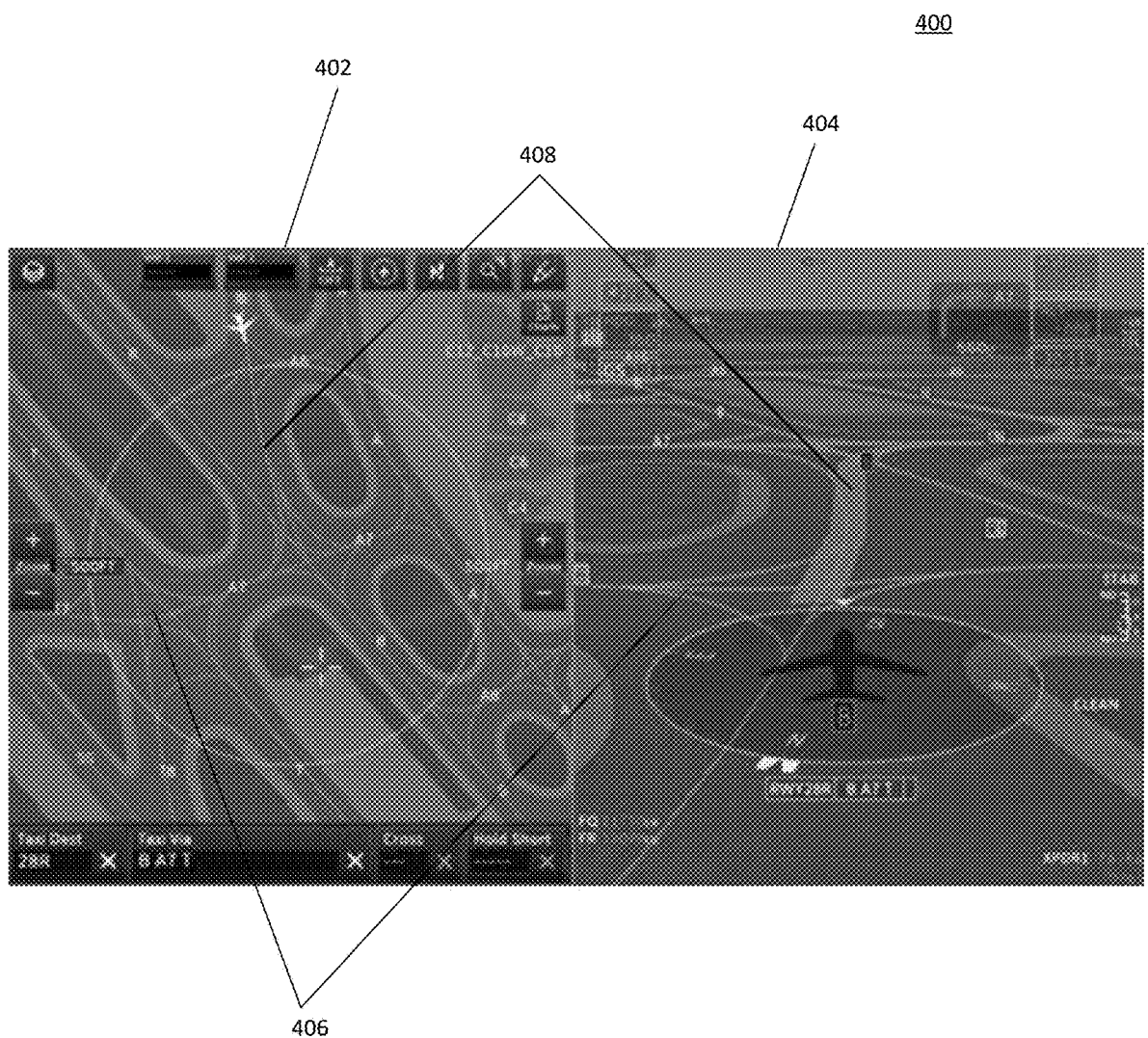
FIG. 4 are two-dimensional (2D) and three-dimensional (3D) images of a generated taxi assist path for an airport in accordance with the disclosed embodiments.

Turning now to FIG. 4, images 400 of a generated taxi assist path are shown including two-dimensional (2D) 402 and three-dimensional (3D) images 403 of the generated taxi assist path for an airport in accordance with the disclosed embodiments. The images also depict the generated taxi assist path 408 and painted guidance lines 406 on the runways and taxiways of the airport. The guidance lines are painted on the surface of the taxiway and are depicted in 2D 402 and 3D 404. The layout of the guidance lines is typically retrieved from an AMDB.

The geometric patterns of the painted guidance lines are often complex. Consequently, the smoothed path may not match the painted guidance lines on the runway or taxiway surface during the generation of the taxi assist path. To compensate, the path construction algorithm retrieves the current guidance lines stored in the AMDB. Then, the path construction algorithm chooses the appropriate guidance line path for the optimum taxi assist path based on edges selected of the optimum route. Additionally, the path computation phase may adjust and correct the taxi assist path to compensate for and correct any anomalies.

Figure 5:
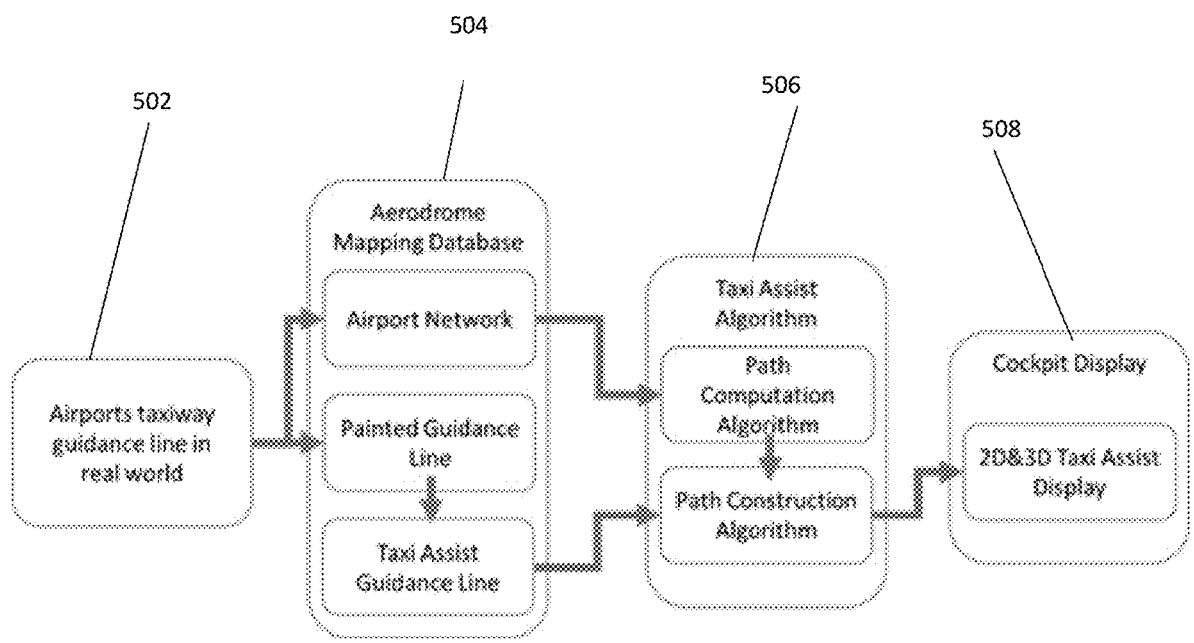
FIG. 5 is a block diagram of a taxiway design algorithm in accordance with the disclosed embodiments.

Tuning now to FIG. 5, a block diagram 500 is shown of a taxiway design algorithm using guidance lines in accordance with the disclosed embodiments. The real world taxiway guidance lines 502 are retrieved from an AMDB 504. The taxi assist algorithm 506 uses the path computation phase to select the optimum taxi assist path is selected for the aircraft from the multiple taxi assist paths. During the path construction phase, the optimum taxi assist path is modified to match corresponding painted taxiway guidance lines and displayed on an aircraft display device 508.

Figure 6:
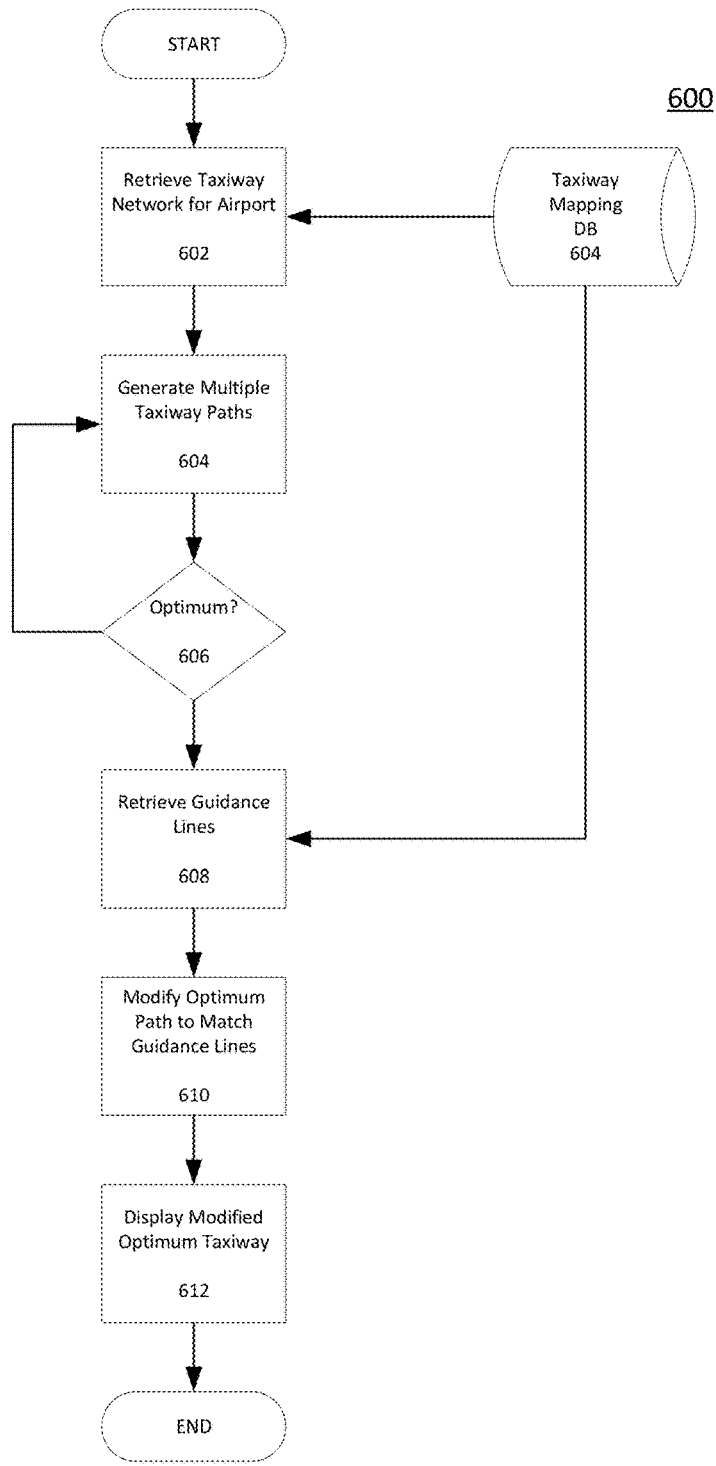
FIG. 6 is a flowchart of a method for generating a taxi assist path for an aircraft at an airport in accordance with the disclosed embodiments.

Turning now to FIG. 6, a flowchart 600 is shown of a method for generating a taxi assist path for an aircraft at an airport in accordance with the disclosed embodiments. First, a network of taxiways/runways for the airport is retrieved 602 and used to generate multiple taxi assist paths 604 for the aircraft from the present location of the aircraft to the destination of the aircraft. The network of taxiways/runways is retrieved from a taxiway mapping database 604. An optimum taxi assist path is selected 606 for the aircraft from the multiple taxi assist paths. A mapping diagram of painted taxiway guidance lines for the airport is retrieved 608. The guidance lines for the airport are retrieved from the taxiway mapping database 604. In other embodiments, the guidance lines for the airport may be retrieved from a separate database. The optimum taxi assist path is then modified 610 to match corresponding painted taxiway guidance lines and displayed 612 on an aircraft display device.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for generating a taxi assist path for an aircraft at an airport, comprising:
   retrieving a network of taxiways/runways for the airport;
   generating multiple taxi assist paths for the aircraft from a present location of the aircraft to a destination of the aircraft;
   selecting an optimum taxi assist path for the aircraft;
   retrieving a mapping diagram of painted taxiway guidance lines for the airport;
   modifying the optimum taxi assist path by smoothing a display of the taxi assist path to match corresponding painted taxiway guidance lines; and
   displaying the modified optimum taxiway on an aircraft display device.

2. The method of claim 1, further comprising:
   dividing the network of taxiways/runways for the airport into a plurality of nodes and edges, where the nodes comprise intersection points of the taxiways and the edges comprise lines between the nodes.

3. The method of claim 2, where the generated taxi assist paths are based on the nodes and edges of the network of taxiways/runways.

4. The method of claim 3, where the generated taxi assist paths are generated utilizing an arc smoothing algorithm at connections between the nodes and edges of the network of taxiways/runways.

5. The method of claim 1, where the aircraft display device displays the modified optimum taxiway in a two-dimensional (2D) display.

6. The method of claim 1, where the aircraft display device displays the modified optimum taxiway in a three-dimensional (3D) display.

7. The method of claim 1, where the aircraft display device displays the modified optimum taxiway in a side by side dual two-dimensional (2D) and three-dimensional (3D) display.

8. The method of claim 1, where the aircraft display device displays the modified optimum taxiway in an airport moving map (AMM) display.

9. A system for generating a taxi assist path for an aircraft at an airport, comprising:
 a computing device located onboard the aircraft, where the computing device,
  retrieves a network of taxiways/runways for the airport from a data source, generates multiple taxi assist paths for the aircraft from a present location of the aircraft to a destination of the aircraft,
  selects an optimum taxi assist path for the aircraft,
  retrieves a mapping diagram of painted taxiway guidance lines for the airport, and
  modifies the optimum taxi assist path by smoothing a display of the taxi assist path to match corresponding painted taxiway guidance lines; and
 an aircraft display device that displays the modified optimum taxiway.

10. The system of claim 1, where the computing device further,
 divides the network of taxiways/runways for the airport into a plurality of nodes and edges, where the nodes comprise intersection points of the taxiways and the edges comprise lines between the nodes.

11. The system of claim 10, where the generated taxi assist paths are based on the nodes and edges of the network of taxiways/runways.

12. The system of claim 11, where the generated taxi assist paths are generated utilizing an arc smoothing algorithm at connections between the nodes and edges of the network of taxiways/runways.

13. The system of claim 9, where the aircraft display device displays the modified optimum taxiway in a two-dimensional (2D) display.

14. The system of claim 9, where the aircraft display device displays the modified optimum taxiway in a three-dimensional (3D) display.

15. The system of claim 9, where the aircraft display device displays the modified optimum taxiway in a side by side dual two-dimensional (2D) and three-dimensional (3D) display.

16. The system of claim 9, where the aircraft display device displays the modified optimum taxiway in an airport moving map (AMM) display.

* * * * *